Patented Mar. 17, 1953

2,631,987

UNITED STATES PATENT OFFICE 2,631,987

METHOD FOR MAKING EMULSIONS OF POLYMETHYL VINYL KETONE

Richard E. Davies, Ridgewood, and Samuel B. McFarlane, Summit, N. J., assignors to Celanese Corporation of America, New York, N. Y., a corporation of Delaware No Drawing. Application July 1, 1949, Serial No. 102,698

5 Claims. (Cl. 260—29.6)

This invention relates to the preparation of emulsions and relates more particularly to the production of improved aqueous emulsions of polymethyl vinyl ketone.

Emulsions of polymethyl vinyl ketone have been found to have wide industrial application as adhesives or bonding materials, impregnating agents, permanent sizes or stiffening materials, as a snag-proof finish for knitted or woven fabrics, as a vehicle for pigments or dyes in the printing of fabrics, as a component in cold water paints and for a wide variety of other uses. For many applications, polymethyl vinyl ketone emulsions of relatively low solids content are suitable. For other applications, emulsions of relatively high solids content are more desirable. However, the preparation of stable emulsions of polymethyl vinyl ketone of a solids content in excess of about 25% has not, heretofore, been entirely successful.

It is, therefore, an important object of this invention to provide a process for the production of emulsions of polymethyl vinyl ketone having a solids content of over 25% by weight and which are sufficiently stable for satisfactory commercial application.

Another object of this invention is the provision of an improved process for the preparation of emulsions of polymethyl vinyl ketone of a solids content of over 25% by weight which are capable of ready dilution without adversely affecting the stability of the emulsion.

Other objects of this invention will appear from the following detailed description.

We have now found that emulsions of polymethyl vinyl ketone of relatively high solids content i. e. over 25% by weight, may be readily formed if methyl vinyl ketone is subjected to an emulsion polymerization treatment for a short period of time in an aqueous medium employing a polymerization catalyst and polyvinyl alcohol as an emulsifying agent and, after a substantial initial polymerization has been effected, i. e. about 50 to 75% of the methyl vinyl ketone present has been polymerized, slowly adding an additional quantity of methyl vinyl ketone to the reaction medium with stirring and effecting further polymerization. Preferably, a reaction temperature of 60 to 80° C. is maintained during the initial and secondary polymerization reactions.

As catalysts which may be employed in effecting said polymerization and emulsification there may be mentioned potassium persulfate or hydrogen peroxide, which catalysts may be employed in an amount of from 0.05 to 1.5% by weight on the weight of the total quantity of methyl vinyl ketone subjected to polymerization and emulsification in accordance with our process.

The amount of polyvinyl alcohol emulsifying agent employed in carrying out our novel process is preferably from about 1.5 to about 5.0% by weight on the weight of the methyl vinyl ketone. The polyvinyl alcohol employed may have a viscosity of 4 to 55 centipoises, the latter being determined in a 4% water solution at 20° C. by the Hoeppler falling ball method. Within the above range of viscosities, which property is, of course, a function of the molecular weight of the polyvinyl alcohol, the characteristics of the polyvinyl alcohol may vary depending upon the degree of hydrolysis of the intermediate polyvinyl acetate from which the polyvinyl alcohol is derived. The degree of hydrolysis of the polyvinyl alcohols we preferably employ may vary from about 85 to 100%.

The polymerization and emulsification reactions are preferably effected by heating with stirring, and under an inert atmosphere such as nitrogen, a mixture of about 25 to 50 parts by weight of methyl vinyl ketone, about 1.5 to 5.0 parts by weight of the polyvinyl alcohol and about 0.05 to 1.5 parts by weight of the desired catalyst in about 100 parts by weight of water, at a temperature of 60 to 80° C. for about 1 to 2 hours, whereby an initial polymerization is effected. Following the initial polymerization, whereby about 50 to 75% of the methyl vinyl ketone present is polymerized, the reaction mixture is further stirred while being maintained at the above temperature and an additional 50 to 75 parts by weight of methyl vinyl ketone are added slowly. A slow addition is important in order to obtain an emulsion of satisfactory stability. The methyl vinyl ketone now present in the reaction mixture is then polymerized during subsequent heating and stirring for about 2 to 4 hours and the whole is converted to a stable emulsion of polymethyl vinyl ketone. The emulsions which we obtain in accordance with our novel process have a high solids content and may be readily diluted with water, if desired, to yield emulsions of any desired degree of dilution without impairment of their stability.

In order further to illustrate our invention, but without being limited thereto, the following examples are given:

Example I 94 parts by weight of a 5% by weight aqueous solution of 98.5–100% hydrolyzed polyvinyl alcohol of a viscosity of 4 to 6 centipoises are introduced into a reaction vessel provided with a stirrer and a suitable inlet and outlet for an inert gas, such as nitrogen. Then 31 parts by weight of a 4% by weight aqueous solution of potassium persulfate and 42 parts by weight of methyl vinyl ketone are added thereto. After flushing the system with nitrogen, the reaction mixture is heated with stirring to a temperature of 70 to 75° C. Polymerization is substantially effected with continued stirring for about one hour and then about 63 parts by weight of methyl vinyl ketone are added slowly with stirring, over the course of about 1½ hours. The reaction is carried out for an additional 2 hours at 75° C. and at completion a thick, stable white emulsion is obtained. The emulsion has a solids content of 47% by weight and may be readily diluted by shaking with water, if desired, to yield stable emulsions of lower solids content.

*Example II*

94 parts by weight of 2.5% by weight aqueous solution of 98.5–100% hydrolyzed polyvinyl alcohol of viscosity of 4 to 6 centipoises are mixed with 31 parts by weight of a 0.4% by weight aqueous solution of potassium persulfate and with 21 parts by weight of methyl vinyl ketone. The mixture obtained is then heated at 70° C. with stirring for one hour under a nitrogen atmosphere. 84 parts by weight of methyl vinyl ketone are then added slowly with stirring to the initial reaction mixture over a period of 3.5 hours and the reaction is then continued for an additional 2 hours at 70° C. A thin, mobile emulsion is obtained containing 42.5% solids.

*Example III*

94 parts by weight of a 2.5% by weight aqueous solution of polyvinyl alcohol and 31 parts by weight of a 0.3% by weight aqueous solution of potassium persulfate are mixed in a suitable reaction vessel and heated to a temperature of 60° C. The system is flushed with nitrogen gas and then 34 parts by weight of methyl vinyl ketone are added. Reaction is effected at 60° C. with stirring for about 40 minutes and then an additional 17 parts by weight of methyl vinyl ketone are added. The reaction is continued with stirring for 1 hour at 60° C. after which 57 parts by weight of methyl vinyl ketone are added, the addition being made over about 1 hour. After a further reaction time of about 4 hours a stable emulsion having a solids content of 44% is obtained. The emulsion may be diluted with water, if desired, without impairing the stability thereof.

*Example IV*

94 parts by weight of a 5% solution of polyvinyl alcohol, 86–89% hydrolyzed and having a viscosity of 35–45 centipoises, 31 parts by weight of water and 0.13 cc. of hydrogen peroxide (90%) are heated to 70° C. with constant stirring. The system is flushed with nitrogen gas and 34 parts by weight of methyl vinyl ketone added. The temperature is maintained at about 75° C. and after reacting for 20 minutes with stirring 71 parts of methyl vinyl ketone are allowed to drop in slowly, i. e. over a period of 1¾ hours. After polymerizing for an additional 4 hours a thin mobile emulsion of 45% solids content is obtained.

It is to be understood that the foregoing detailed description is given merely by way of illustration and that many variations may be made therein without departing from the spirit of our invention.

Having described our invention, what we desire to secure by Letters Patent is:

1. Process for the production of emulsions of polymethyl vinyl ketone of solids content of at least 25%, which comprises introducing into a reaction zone a mixture of 25 to 50 parts by weight of methyl vinyl ketone, 1.5 to 5 parts by weight of polyvinyl alcohol as an emulsifying agent, 0.05 to 1.5 parts by weight of an oxygen-yielding polymerization catalyst, and 100 parts by weight of water, heating said mixture to a temperature of 60 to 80° C. to effect polymerization of the methyl vinyl ketone, and, after polymerization of 50 to 75% of the methyl vinyl ketone initially present has been effected, slowly adding 50 to 75 parts by weight of methyl vinyl ketone, without additional emulsifying agent and catalyst, to the reaction mixture in said reaction zone and continuing the polymerization in the same reaction zone at a temperature of 60 to 80° C. until the added methyl vinyl ketone has been polymerized.

2. Process for the production of emulsions of polymethyl vinyl ketone of solids content of at least 25%, which comprises introducing into a reaction zone a mixture of 25 to 50 parts by weight of methyl vinyl ketone, 1.5 to 5 parts by weight of polyvinyl alcohol as an emulsifying agent, 0.05 to 1.5 parts by weight of an oxygen-yielding polymerization catalyst, and 100 parts by weight of water, heating said mixture to a temperature of 60 to 80° C. for about 1 to 2 hours to effect polymerization of the methyl vinyl ketone, and, after polymerization of 50 to 75% of the methyl vinyl ketone initially present has been effected slowly adding 50 to 75 parts by weight of methyl vinyl ketone, without additional emulsifying agent and catalyst, to the reaction mixture in said reaction zone and continuing the polymerization in the same reaction zone at a temperature of 60 to 80° C. for about 2 to 4 hours.

3. Process for the production of emulsions of polymethyl vinyl ketone of solids content of at least 25%, which comprises introducing into a reaction zone a mixture of 25 to 50 parts by weight of methyl vinyl ketone, 1.5 to 5 parts by weight of polyvinyl alcohol as an emulsifying agent, 0.05 to 1.5 parts by weight of potassium persulfate, and 100 parts by weight of water, heating said mixture to a temperature of 60 to 80° C. to effect polymerization of the methyl vinyl ketone, and, after polymerization of 50 to 75% of the methyl vinyl ketone initially present has been effected, slowly adding 50 to 75 parts by weight of methyl vinyl ketone, without additional emulsifying agent and catalyst, to the reaction mixture in said reaction zone and continuing the polymerization in the same reaction zone at a temperature of 60 to 80° C. until the added methyl vinyl ketone has been polymerized.

4. Process for the production of emulsions of polymethyl vinyl ketone of solids content of at least 25%, which comprises introducing into a reaction zone a mixture of 25 to 50 parts by weight of methyl vinyl ketone, 1.5 to 5 parts by weight of polyvinyl alcohol as an emulsifying agent, 0.05 to 1.5 parts by weight of potassium persulfate, and 100 parts by weight of water, heating said mixture to a temperature of 60 to 80° C. for about 1 to 2 hours to effect polymerization of the methyl vinyl ketone, and, after polymerization of 50 to 75% of the methyl vinyl ketone initially present has been effected, slowly adding 50 to 75 parts by weight of methyl vinyl ketone, without additional emulsifying agent and catalyst, to the reaction mixture in said reaction zone and continuing the polymerization in the same reaction zone at a temperature of 60 to 80° C. for about 2 to 4 hours.

5. Process for the production of emulsions of polymethyl vinyl ketone of solids content of at least 25%, which comprises introducing into a reaction zone a mixture of 25 to 50 parts by weight of methyl vinyl ketone, 1.5 to 5 parts by weight of polyvinyl alcohol as an emulsifying agent, 0.05 to 1.5 parts by weight of potassium persulfate, and 100 parts by weight of water, heating said mixture with stirring and under a nitrogen atmosphere to a temperature of 60 to 80° C. for about 1 to 2 hours to effect polymerization of the methyl vinyl ketone, and, after polymerization of 50 to 75% of the methyl vinyl ketone initially present has been effected, slowly adding 50 to 75 parts by weight of methyl vinyl ketone, without additional emulsifying agent and catalyst, to the reaction mixture in said reaction zone and continuing the polymerization in the same reaction zone at a temperature of 60 to 80° C. for about 2 to 4 hours.

RICHARD E. DAVIES.
SAMUEL B. McFARLANE.

REFERENCES CITED

The following references are of record in the file of this patent:

UNITED STATES PATENTS

| Number | Name | Date |
|---|---|---|
| 2,191,520 | Crawford et al. | Feb. 27, 1940 |
| 2,227,163 | Starck et al. | Dec. 31, 1940 |
| 2,289,540 | Dittmar et al. | July 14, 1942 |
| 2,462,354 | Brubaker et al. | Feb. 22, 1949 |
| 2,473,929 | Wilson | June 21, 1949 |
| 2,475,016 | De Nie | July 5, 1949 |
| 2,537,334 | De Nie | Jan. 9, 1951 |

FOREIGN PATENTS

| Number | Country | Date |
|---|---|---|
| 489,343 | Great Britain | July 21, 1938 |